Dec. 30, 1941. H. E. FELLOWS 2,268,208
METHOD OF AND APPARATUS FOR MOLDING
Filed April 26, 1940 4 Sheets—Sheet 2
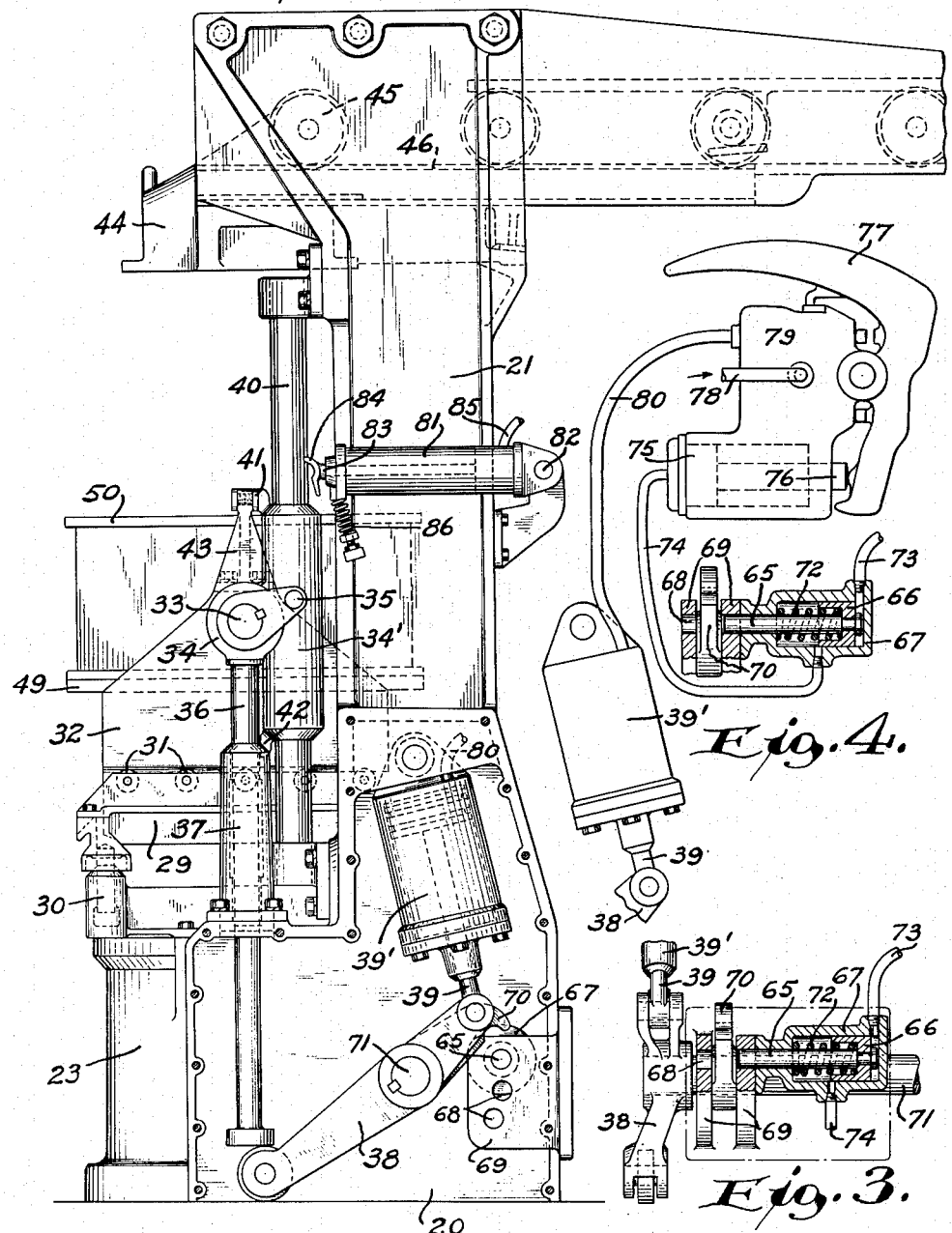
INVENTOR
Harrison E. Fellows,
BY
Morsell, Sieber & Morsell
ATTORNEYS.

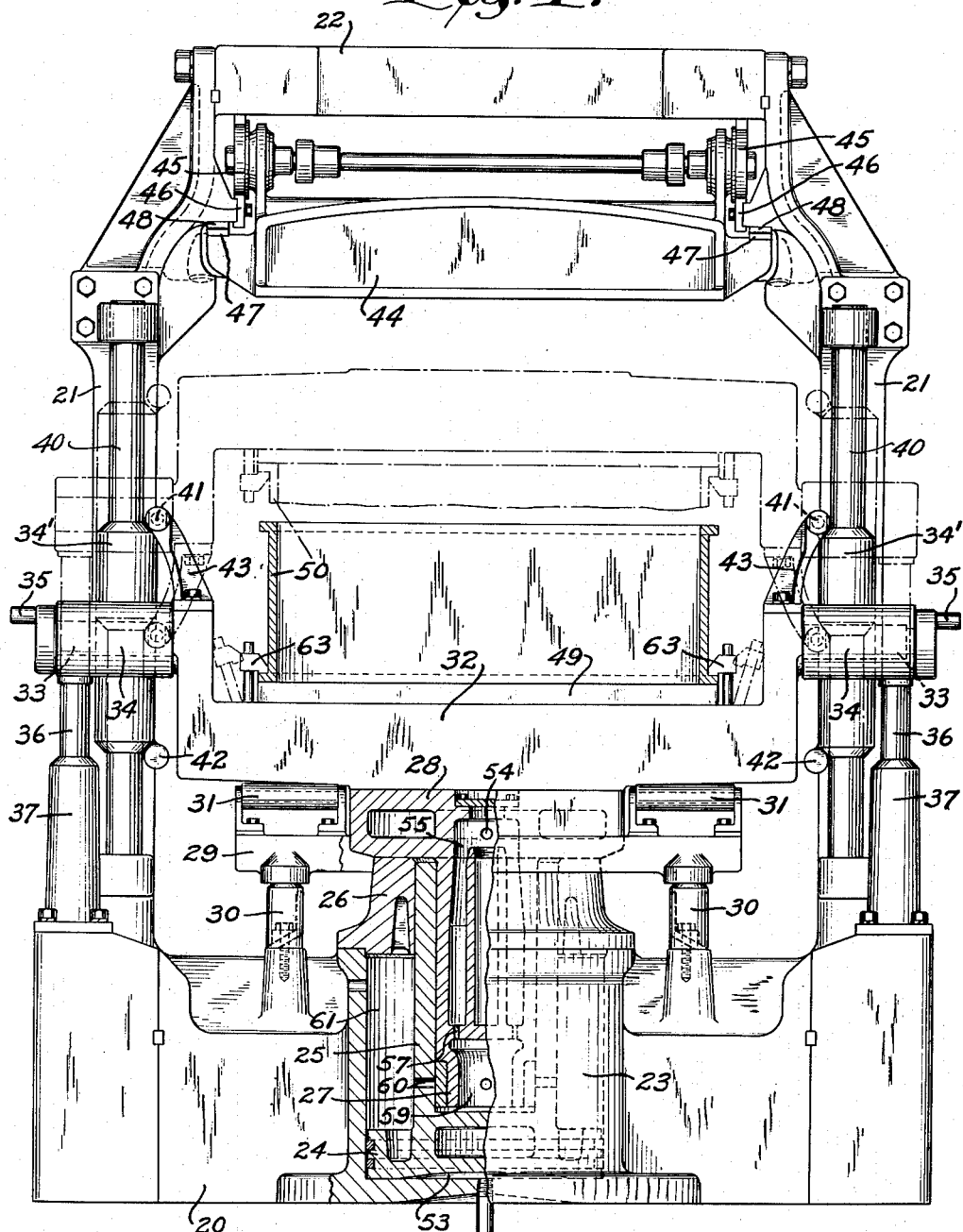

Dec. 30, 1941.  H. E. FELLOWS  2,268,208
METHOD OF AND APPARATUS FOR MOLDING
Filed April 26, 1940   4 Sheets-Sheet 3

INVENTOR
Harrison E. Fellows,
BY
Morsell, Lieber & Morsell
ATTORNEYS.

Dec. 30, 1941.   H. E. FELLOWS   2,268,208
METHOD OF AND APPARATUS FOR MOLDING
Filed April 26, 1940   4 Sheets-Sheet 4
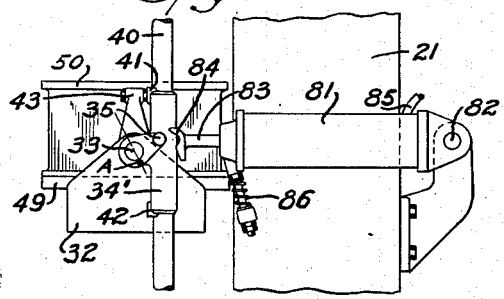
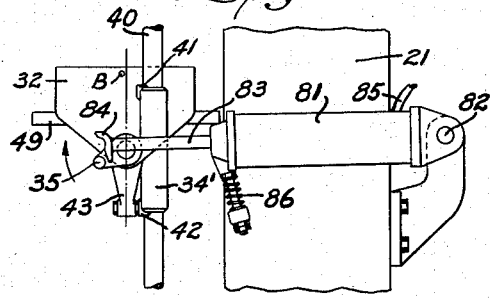
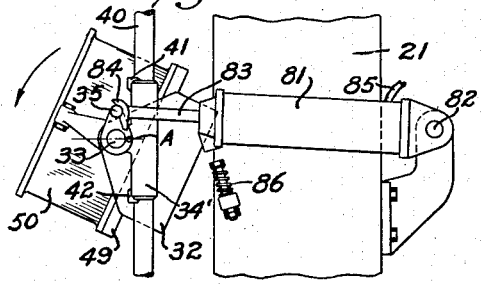
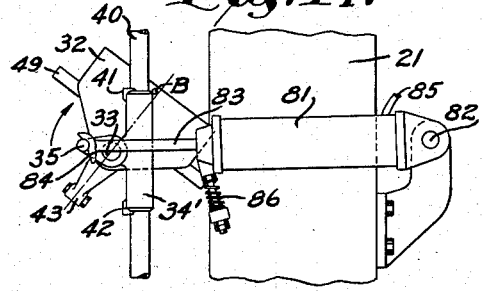
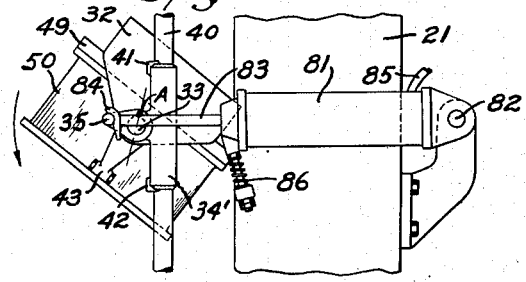
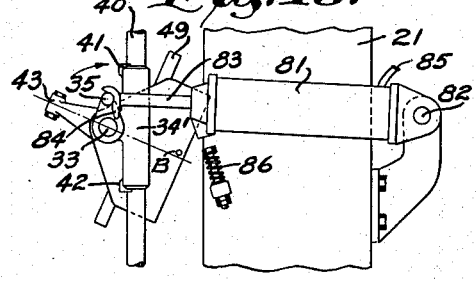
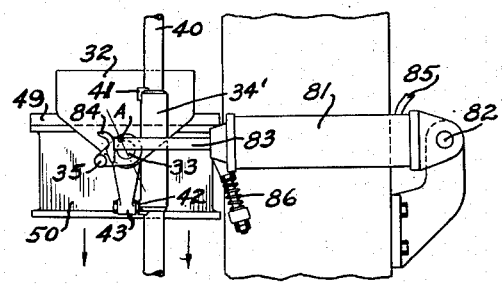
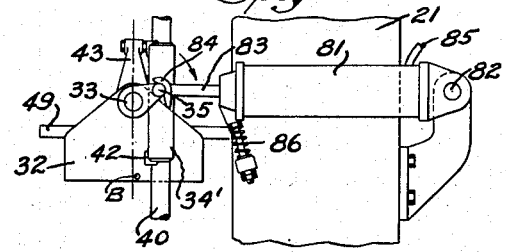
INVENTOR
Harrison E. Fellows,
BY
Morsell, Lieber + Morsell
ATTORNEYS.

Patented Dec. 30, 1941

2,268,208

UNITED STATES PATENT OFFICE 2,268,208

METHOD OF AND APPARATUS FOR MOLDING

Harrison E. Fellows, Wauwatosa, Wis., assignor to Milwaukee Foundry Equipment Company, Milwaukee, Wis., a corporation of Wisconsin Application April 26, 1940, Serial No. 331,719

8 Claims. (Cl. 22—199)

This invention relates in general to improvements in the art of molding, and relates more specifically to an improved method of and apparatus for producing molds of sand or the like.

A general object of the present invention is to provide a new and useful method of producing sand molds or the like, efficiently and in an expeditious manner.

Another general object of the invention is to provide improved apparatus especially adapted to carry on the improved method of producing sand molds or the like.

A number of different types of sand mold producing methods and machines have heretofore been proposed and used commercially with moderate success, and while some of these prior mechanisms may be adapted to perform jolting, squeezing, rolling-over, and pattern drawing operations, all of the prior devices are either too complicated, cumbersome, slow in action, difficult to actuate, unreliable, and otherwise objectionable. In some of the prior machines the entire rather bulky and cumbersome squeezing mechanism is jolted bodily in guideways, while in others the squeezing mechanism is mounted upon trunnions against which the jolting force or impact is directly applied or exerted, and in still others the squeeze piston must raise the inverting or roll-over cradle away from its supporting bearings and jolt against this piston, so that all of these types are objectionable because of improper application and distribution of forces and resultant excessive wear and tear on the parts. Many of the prior molding mechanisms also require detachable bottom or molding boards in order to retain the sand in the flasks during the inverting or rolling-over operation, and in some instances the squeezing pressure is applied against the bottom board during the rolling-over or inverting operation, while in other cases the molding board must be clamped to the flask before rolling-over and the squeezing pressure is subsequently applied, thus undesirably complicating the mechanism and entailing loss of valuable time in production of the successive molds. Still another serious objection to the prior molding machines and mechanisms, has been the inability to properly control and balance the roll-over or mold inverting cradle, so that this cradle could be quickly inverted with the mold in place and could be subsequently rapidly returned in empty or unloaded condition, without the use of complicated mechanism and without endangering the operator.

In view of the foregoing objectionable features of the prior mold producing methods and machines, the present invention contemplates provision of a simplified method and apparatus which obviates all of the objections referred to, and whereby successive molds of various shapes may be rapidly and accurately produced with minimum power and without danger.

Another specific object of my invention is to provide a sand mold producing method involving a minimum number of simple and smoothly transitory steps in rapid sequence which make it possible to safely construct the molds with the least effort and loss of time.

A further specific object of this invention is to provide simple, compact and durable apparatus of the roll-over type, for producing sand molds in rapid succession with minimum power and without endangering the operator.

These and other objects of my present invention will be apparent from the following detailed description, and the above-mentioned objections are effectively overcome with my improved method and apparatus, by permitting the roll-over cradle and mold to rest solidly upon the jolting table so that the jolting impact is transmitted directly to the heavy base of the machine without subjecting the trunnions or other less sturdy parts to excessive stress, and without necessitating undesirable movement of the squeeze piston in order to effect jolting. With my invention, the squeezing pressure is preferably applied directly to the sand in a partitioned flask with the aid of a platen equipped with suitable tapered peens so as to obtain maximum squeezing effect, and the squeeze is applied before inversion of the mold in order that the sand may be thoroughly packed around and between the flask partition bars and will remain in place during the rolling-over operation and thereafter, without the aid of bottom boards. The roll-over cradle is dogged into elevated position immediately following the squeezing operation and without loss of time occasioned by completely lowering the cradle with the squeeze piston, and the cradle is thus positioned preparatory to inversion thereof with the least number of operations. The inverting cradle is so formed and suspended that the center of gravity of the combined mass comprising the mold and supporting cradle may be located at or near the axis of inversion so that rolling-over may be effected with minimum power and shock, and rotation of the cradle when loaded may be quickly and safely effected with the aid of a servo-motor or power cylinder of relatively small capacity. When the mold is removed, the inverting cradle is unbalanced but the pressure locked in the power cylinder acts as a cushion by controlling the release of air. The dogging pistons are also used to withdraw the pattern, and the use of loose boards and complicated parts is avoided, while the number of operations is reduced to a minimum.

A clear conception of the several steps involved in my present improvement, and of the construction and operation of a mold producing machine for carrying on the improved method may be had by referring to the drawings accompanying and forming a part of this specification wherein like reference characters designate the same or similar parts in the various views.

Fig. 1 is a front view of one of the improved molding machines, showing portions in section and also depicting the roll-over cradle in dot-and-dash lines in inverted position.

Fig. 2 is a side view of the machines shown in Fig. 1.

Fig. 3 is a part sectional rear view of a portion of the mechanism for controlling the position of the cradle dogging and supporting plungers;

Fig. 4 is a somewhat diagrammatic part sectional view of the cradle dogging and positioning mechanism;

Fig. 12 is a diagram showing a jolted end squeezed mold in position preparatory to inversion thereof;

Fig. 13 is a similar diagram showing the power device applied to initially tilt the mold and cradle during the rolling-over operation;

Fig. 14 is another diagram showing the servo-motor in action to partially invert the mold and cradle;

Fig. 15 is still another diagram showing the mold and cradle completely inverted, preparatory to withdrawal of the pattern;

Fig. 16 is a diagram showing the cradle and servo-motor assemblage after a completed mold has been removed and preparatory to return of the cradle;

Fig. 17 is a similar diagram showing the power device being utilized to cushion the return of the cradle, the cradle being initially tilted;

Fig. 18 is another diagram showing the cradle partially inverted and the cushioning devices still in action; and Fig. 19 is still another diagram showing the cradle returned to normal for reception of another flask.

Figure 5:
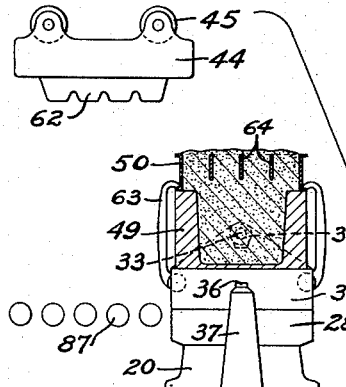
Fig. 5 is a diagram showing the initial step of positioning the pattern and mold on the cradle, and of filling the positioned parts with sand preparatory to jolting.

While the invention has been shown and described herein as being applied and utilized for the purpose of producing ordinary sand molds, it is not intended to thereby unnecessarily limit the scope or utility since the improved process and apparatus may be used advantageously in the production of cores and other molded objects.

Referring especially to Figs. 1 to 4 of the drawings, the improved molding machine shown therein is especially adapted to carry on my improved method and comprises, a main frame having a massive base 20, laterally spaced side beams or columns 21 rigidly attached to the base 20, and a cross-beam 22 rigidly interconnecting the upper extremities of the columns 21; a stationary squeeze cylinder 23 formed integral with the base 20 and having therein a relatively large vertically movable squeeze piston 24 provided with an annular bored wall 25 which is slidable in an upper head 26 secured to and providing a closure for the cylinder 23; a jolt piston 27 vertically reciprocable within the central bore of the wall 25 and having a support or plate 28 formed integral with its upper extremity; a leveling device consisting of a rectangular frame 29 surrounding the plate 28 and resting upon automatically adjustable corner struts 30 carried by the base 20, and a series of rollers 31 journalled on each of the opposite sides of the frame 29 beyond the adjacent sides of the supporting plate 28; a pattern and mold supporting cradle 32 normally resting upon the plate 28, but adapted to be rotatably suspended from alined trunnions 33 secured to the opposite sides of the cradle 32 and coacting with bearing blocks 34, each trunnion 33 having a crank pin 35 at its outer end; a pair of cradle dogging and suspending rods 36 slidably supported in fixed vertical guides 37 carried at opposite sides of the base 20, each rod 36 being vertically movable in alinement with the adjacent trunnion bearing block 34 by means of a lever 38 and a piston 39 movable in a pivotally suspended cylinder 39'; mechanism for automatically controlling the movement of the dogging rods 36; a pair of oppositely disposed vertical guide rods or beams 40 secured to the base 20 and columns 21 and having thereon slides 34' secured to the adjacent blocks 34 and provided with upper and lower stop pads 41, 42 respectively, which are engageable with the swinging ends of arms 43 rigidly attached to the opposite sides of the cradle 32; a squeeze carriage 44 suspended by wheels 45 from rails 46 secured to the columns 21 beneath the cross-beam 22, and having opposite side projections 47 which are cooperable during squeezing with abutments 48 secured to the columns 21; and mechanism for actuating the various elements and for conducting molds 51 from the machine.

The main frame assemblage should be of durable and rugged construction adapted to effectively withstand the jarring and jolting to which it is subjected, and while the jolt piston 27 is associated directly with the cradle and mold supporting plate 28, this plate is adapted to jolt directly against the cylinder head 26 which is supported directly upon the massive base 20, so that the squeeze piston 24 is not directly subjected to the jolting impact. The squeeze and jolting pistons 24, 27 are operable by fluid such as air under pressure, independently of each other, and actuating fluid for elevating the squeeze piston 24 is admissible to the lower displacement chamber 53 of the cylinder 23, in a well known manner, see Fig. 1. The jolting piston 27 is operable by fluid under pressure admitted from an inlet port 54 to the upper chamber 55, and this actuating fluid is adapted to flow through small ports 57 in the piston 27 into the lower displacement chamber 59 from whence the fluid escapes through one or more exhaust ports 60 when the piston 27 has been elevated sufficiently to open the ports 60. The chamber 61 above the squeeze piston 24 communicates with the exhaust, and when the piston 27 has been elevated sufficiently to open the exhaust ports 60, the piston 27 together with its load supporting plate 28 will drop by gravity thereby imparting a jolt to the plate 28 while transmitting the impact to the base 20. The admission of actuating fluid to and from the squeeze and jolt cylinders may be controlled with simple valves in a well known manner, and when fluid under pressure is admitted through the inlet port 54, the jolting will continue until the fluid supply is cut off.

Figure 6:
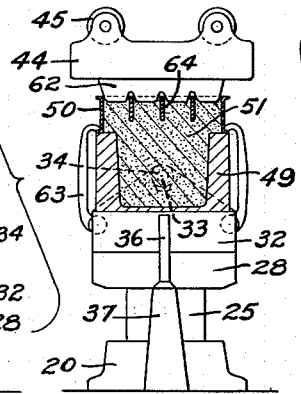
Fig. 6 is a similar diagram depicting the second operation of squeezing after the platen has been properly positioned.

The squeeze piston 24 is adapted to elevate the cradle 32 and the pattern 49 and flask 50, sufficiently to cause the latter to cooperate with a peen member or platen 62 secured to the carriage 44, when this carriage has been positioned directly above the central axis of the cylinder 23, see Fig. 6. The side columns 21 of the main frame should be of sufficient height to accommodate peen members 62 of various heights, and to also accommodate patterns 49 and flasks 50 of various heights; and the patterns 49 which may be of diverse shapes and sizes, are bolted to the deck of the cradle 32 and the flasks 50 are releasably clamped against the patterns by means of adjustable clamping hooks 63. This clamping of the flask 50 to the pattern may be effected at any time after the flask is applied to the machine and before the mold is inverted. The molding flasks 50 are preferably provided with transverse rigid walls or partitions 64 with which the peens of the platen 62 are cooperable as shown in Fig. 6, to firmly press the molding sand into the flask; and the peen supporting carriage 44 is movable horizontally along the rails 46 to position the same either in vertical alinement with the flask, pattern and mold assemblage, or removed therefrom so as to permit unobstructed insertion of molding sand, inversion of the cradle, and withdrawal of the molds from the pattern, see Figs. 5 and 7 to 11 inclusive.

After a squeezing operation has been completed by elevation of the supporting plate 28, cradle 32 and the pattern and mold assemblage carried by the latter, as shown in Fig. 6, the piston 24 and plate 28 must be lowered to provide clearance for the carriage 44 during the roll-over operation. In order to prevent loss of time occasioned by lowering of the cradle 32 with the plate 28 and by subsequent elevation of the cradle preparatory to rolling-over, the parallel dogging rods 36 are automatically elevated during the squeezing operation to a position slightly below the bearing blocks 34 of the cradle trunnions 33 when final squeezing is being effected. This elevation of the suspension rods 36 during or directly after squeezing, may be accomplished with the aid of fluid under pressure delivered from the lower displacement chamber 53 of the squeeze piston 24 by utilizing the special control mechanism illustrated in Figs. 2, 3 and 4. Depending upon the height of the pattern 49, flask 50, and peen platen 62, it is necessary to elevate the cradle 32, more or less, and the degree of elevation of the rods 36 must therefore be varied to suit various operating conditions. If the rods 36 are raised too high, they will engage the blocks 34 and tend to move the tubular slides 34' along the rods 40 before squeezing has been completed, and will thus hold the mold 51 in contact with the peen platen 62. The rods 36 should therefore be elevated only sufficient to engage the blocks 34 when the mold 51 has descended after squeezing sufficient to clear the peens and thus permit the carriage 44 to be withdrawn, and I therefore provide on each side of the machine, a stop pin 65 carried by a piston 66 which is movable in a cylinder 67, this pin 65 being cooperable with openings 68 in fixed lugs 69 and with a hook 70 carried by the pivot or supporting shaft 71 of the lever 38, to definitely limit the upward travel of the dogging rods 36 prior to the rolling-over operation. Each cylinder 67 is adjustable so that the pin 65 will cooperate with any selected alined set of the openings 68, and when set as shown in Fig. 2, the rods 36 will have minimum upward travel, whereas setting of the cylinder 67 and pin 65 to cooperate with the lowermost set of openings 68 will afford maximum upward movement of the rods 36 when the pin 65 is effective. It should be noted, however, that the pin 65 is moved into position so as to limit the upward travel of the dogging rods 36, only following the squeezing operation, and that the rods 36 are movable to their extreme uppermost position by the pistons 39 and levers 38 without obstruction by the pin 65 when the pattern is being withdrawn from the mold.

The piston 66 and pin 65 are normally positioned within the cylinder 67 and relative to the lugs 69, as shown in Figs. 3 and 4, by means of a spring 72, and high pressure fluid from the squeeze cylinder chamber 53 may be admitted to the cylinder 67 through a conduit 73. When the pin 65 has been moved across the gap between the fixed ears 69 and into the path of movement of the hook 70, the spring 72 is compressed, and the piston 66 will have been moved sufficiently to open a port communicating through a conduit 74 with a servo-motor 75, see Fig. 4. The piston 76 of the servo-motor 75 is cooperable with the manually operable control lever 77 which normally controls the admission of fluid under pressure from a supply line 78 past a valve 79 and through a pipe 80 to the cylinder 39'; and when the lever 77 is thus operated, fluid under pressure will be applied to the piston 39 so as to swing the lever 38 and move the rods 36 until the stop hook 70 engages the pin 65. The rods 36 will thus be elevated only to a predetermined extent, and will remain locked in elevated position during roll-over operation and until the lever 77 is subsequently manipulated to exhaust fluid under pressure from the cylinder 39'. The piston 66 and pin 65 will then be returned to retracted position by the spring 72, so that the mechanism will be ready for pattern withdrawal after the roll-over operation has been completed.

Figure 7:
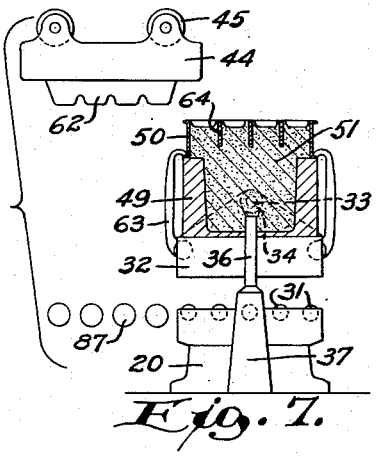
Fig. 7 is another diagram illustrating the next step of removing the squeeze pressure while maintaining the cradle suspended from the dogging plungers, and also showing the platen withdrawn.
Figures 8, 9:
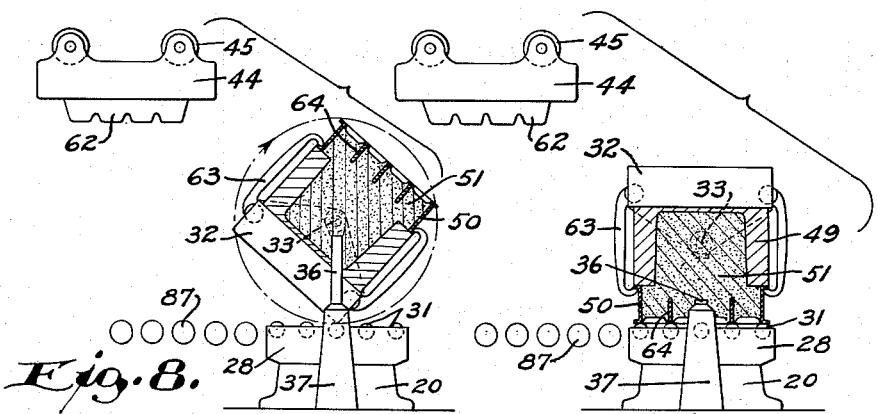
Fig. 8 is another similar diagram showing the mold in the act of being inverted.
Fig. 9 is a further diagram depicting the mold inverted and resting upon the leveling device, with the dogging plungers retracted.

When the rods 36 have been dogged into elevated position and the pistons 24, 27 and support 28 have been lowered following the squeeze, the cradle 32 and the mold assembly carried thereby, will settle to the position shown in Fig. 7 with the blocks 34 resting upon the upper extremities of the temporarily fixed rods 36, and the carriage 44 and peen platen 62 should then be removed by rolling the same along the rails 46. If the center of gravity A of the combined mass of the cradle 32, pattern 49, flask 50 and mold 51 is at or near the common horizontal axis of the trunnions 33, as in Figs. 5 to 9 inclusive, the roll-over or inversion can be readily effected by hand as depicted in Fig. 8; but if this center of gravity A is not thus positioned the mass will be unbalanced and more difficult to invert. Rolling over may therefore be effected with the aid of a pair of fluid pressure actuated power devices such as shown in Figs. 2 and 12 to 19 inclusive, and each of these improved devices comprises a cylinder 81 swingably suspended from a pivot pin 82 and having therein a piston 83 provided with a socket 84 which is cooperable with the adjacent crank pin 35. The piston 83 may be movable in one direction by fluid under pressure admitted through a conduit 85, and in the opposite direction by a return spring, and the swinging end of each cylinder 81 is cooperable with a spring buffer 86 carried by the adjacent column 21 from which the pin 82 is also suspended. The cradle 32 and the mold assembly supported thereon will be in the position shown in Fig. 12 before inversion of the mold, and the pistons 83 and sockets 84 may then be advanced toward the adjacent crank pins 35. In Fig. 13, such engagement has taken place, and the mold has started to roll over, and in Fig. 14 partial inversion has been effected, while in Fig. 15 the rolling-over operation has been completed. It is noteworthy, that during this roll-over operation of the mold assembly and cradle, the center of gravity A of the mass revolves about the common axis of the trunnions 33, and the spring buffer 86 prevents shock and the mold can be brought gently to rest in inverted condition when the pins 35 leave the sockets 84. During the rolling-over operation the rigid cradle arms 43 swing from positions of engagement with the upper stops 41 to positions of contact with the lower stops 42.

Figure 10:
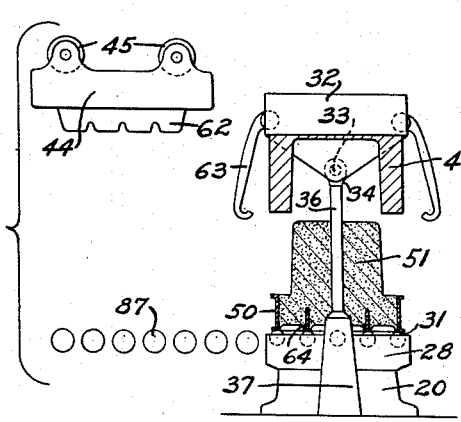
Fig. 10 is an additional diagram illustrating the step of drawing the pattern with the aid of the dogging plungers.
Figure 11:
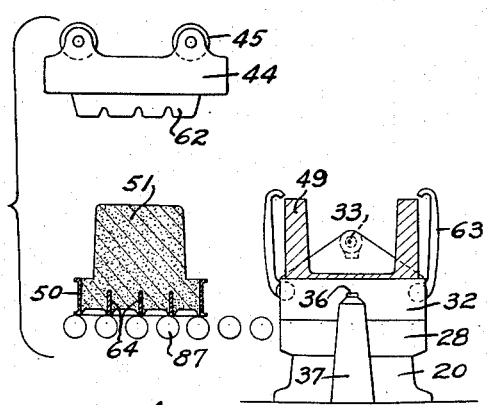
Fig. 11 is still another diagram showing the completed mold being removed, and the cradle returned for the application of a new flask and for the reception of a fresh supply of sand.

After the roll-over operation has been completed, the inverted flask 50 may be brought to rest upon the rollers 31 of the leveling frame 29, by lowering the plunger rods 36, and this may be done by manipulating the lever 77 to release the fluid under pressure from the cylinders 39'. The mold assemblage with the cradle 32 and pattern 49 disposed thereabove, will then be positioned as shown in Fig. 9, whereupon the clamps 63 should be released. By subsequently manipulating the lever 77 to admit fluid under pressure to the cylinders 39', the levers 38 will be swung about their fulcrum pins 71 to simultaneously move the plunger rods 36 upwardly and to thereby elevate the pattern 49 and cradle 32 and to withdraw the pattern from the mold as shown in Fig. 10. The completed mold 51 and flask 50 may thereafter be removed from the machine on conveying rollers 87, in a well known manner, and the cradle 32 and pattern 49 should be reversed preparatory to reception of a new flask 50, as illustrated in Fig. 11. Since the previous removal of the mold 51 and flask 50, has shifted the center of gravity B of the revolving mass comprising the cradle and pattern alone, farther from the axis of the trunnions 33 as shown in Figs. 16 to 19 inclusive, it is preferable to utilize the power cylinders 81 and pistons 83 in order to effect both speedy and safe reversal of the cradle 32 and pattern 49 attached thereto, and in Fig. 16 the sockets 84 are still located in proximity to the crank pins 35 while the trunnions 33 are elevated and being supported by the dogging rods 36. Fluid under pressure is confined within the cylinders 81, so that the cradle 32 and pattern 49 may then be revolved against a fluid cushion to the positions shown in Fig. 17 and in Fig. 18, and finally positioned in reversed position as in Fig. 19, gradually, safely and without shock, and the cradle 32 may be subsequently lowered upon the supporting plate 28 by lowering the rods 36, preparatory to the production of another mold.

While the several steps involved in my new method of producing molds should be relatively apparent from the foregoing detailed description of the construction and operation of my improved apparatus, a short résumé of the improved method will be given, and reference should be made particularly to Figs. 5 to 19 inclusive. When starting the production of a mold, the cradle 32, pattern 49 and flask 50 should be assembled as shown in Fig. 5 with the flask 50 clamped to the pattern 49 by means of clamps 63, and the carriage 44 should be removed so as to permit free application of the mold-forming material or sand. In this position the assemblage is jolted so as to firmly pack the sand within the corners and crevices of the pattern, and when jolting has been effected, the carriage 44 should be positioned above the partially formed mold and the squeeze piston 24 should be elevated to the position shown in Fig. 6. During the squeezing operation, the dogging rods 36 are elevated so that when the squeezing operation has been completed and the piston 24 is lowered, the trunnion blocks 34 will engage the rods 36. While squeezing is being effected the peen platen 62 will cooperate with the upwardly moving support 28 to firmly pack the sand around the ribs 64 and within the flask 50, and when the bearing blocks 34 have been lowered against the upstanding dogging rods 36 as in Fig. 7, the carriage 44 may be removed preparatory to the rolling-over operation. During the roll-over operation, the mold assemblage and cradle are revolved, as shown in Fig. 8, and after this operation has been completed, the dogging rods 36 are lowered and the flask 50 is deposited upon the rollers 31 of the leveling device, as clearly shown in Fig. 9. While a specific type of leveling device has been shown, this may be replaced by any suitable means for properly positioning the mold and pattern for separation, and need not actually position the parts for true vertical separation. With the mold in level condition, the dogging rods 36 may again be elevated to raise the cradle 32 and the pattern 49 associated therewith, whereupon the completed mold 51 may be removed upon the conveyor rollers 87, and the cradle 32 and pattern 49 may be returned to mold-forming position, as illustrated in Fig. 11. During these various movements of the mold assemblage and cradle about the axis of the trunnions 33, the power device specifically shown in Figs. 12 to 19 inclusive, may be utilized to good advantage in aiding the roll-over and return operations. The mechanism shown in Figs. 2, 3 and 4 may also be utilized to control the accurate positioning of the dogging rods 36 during the roll-over and return operations, and the jolting and squeezing operations may be controlled in the usual manner with the aid of levers and valves. All of the molding operations may be conveniently effected with the aid of fluid under pressure suitably applied to the various parts, and the successive steps follow each other in rapid succession so that the successive molds may be quickly produced.

From the foregoing detailed description it will be apparent that my present invention provides an improved method of and apparatus for safely and effectively producing sand molds or the like in rapid succession. The improved method may be carried on with relatively simple, compact and sturdy apparatus conveniently manipulable so as to enhance the rate of production of the successive molds. With my improved apparatus the jolting impact is delivered directly to a massive foundation or base plate, and relatively delicate bearings and other parts are not subjected to this jolting. The squeezing or compressing operation may be effected quickly after the jolting has been completed, and the roll-over or inversion operations may be effected in rapid succession. The withdrawal of the pattern can be quickly and safely effected without danger of damaging the molds, and the return of the carriage to a mold-forming position may obviously be just as readily effected so as to enhance the speed and accuracy of operation.

It should be understood that it is not desired to limit the present invention to all of the several steps herein described, or to all of the details of construction herein shown and described, for various modifications within the scope of the claims may occur to persons skilled in the art.

I claim:

1. In a molding machine, an invertible cradle for directly and fixedly supporting a pattern for the reception of molding material from above, means for jolting said cradle directly against a fixed rigid support, means for elevating the jolted cradle and mold assemblage to squeeze the sand, means for inverting the elevated cradle and mold assemblage, and means for finally withdrawing the squeezed mold from beneath the inverted cradle and pattern.

2. In a molding machine, an upwardly movable squeeze piston, a jolt piston movably supported by said squeeze piston, a pattern supporting cradle positionable for jolting operations solely upon said jolt piston, said jolt piston being operable to jolt said cradle without imparting impact to squeeze the piston while the latter is in a retracted position, a platen cooperable with said squeeze piston through said jolt piston to squeeze a mold resting upon said cradle, means for inverting said cradle and the mold carried thereby, and means for moving said cradle upwardly to remove the pattern from the mold.

3. In a molding machine, an upwardly movable squeeze piston, a pattern supporting cradle movable upwardly by said piston, a platen cooperable with said squeeze piston to compress a mold coacting with said pattern when said piston is elevated, a dogging device movable upwardly while said squeeze piston is elevated to support said cradle in an elevated position when said squeeze piston is lowered, and means for effecting inversion of said cradle upon said dogging device after said squeeze piston has been lowered.

4. In a molding machine, a relatively massive base, a squeeze piston movable upwardly from said base, a jolt piston carried by said squeeze piston and being joltable directly against said base independently of said squeeze piston and while the latter is in a retracted position, a revolvable pattern supporting cradle adapted to rest upon said jolt piston, dogging rods movable upwardly while said squeeze piston is elevated to revolvably suspend said cradle when said squeeze piston descends, and means cooperable with said squeeze piston to squeeze mold-forming material against a pattern carried by said cradle.

5. In a molding machine, an upwardly movable piston, a pattern and flask supporting cradle movable upwardly by said piston, means disposable above said piston and being cooperable therewith to squeeze sand within said flask and against said pattern, and means movable into active position while said piston and squeezing means are functioning and while the cradle is elevated for removing said cradle from said piston while the latter descends and for revolvably suspending said cradle.

6. In a molding machine, an upright rigid frame member, a pattern supporting cradle, a vertically movable member for engaging and vertically moving said cradle for jolting and squeezing operations, vertically movable dogging members, means rotatably suspending said cradle from said dogging members, power means carried solely by said rigid frame member engageable with said cradle to invert the same, and buffer means associated with said power means for cushioning the cradle upon complete inversion of the same.

7. In a molding machine, an upright rigid frame member, an upwardly movable support, a pattern supporting cradle movable by said support for sand squeezing operations, upwardly movable dogging means for rotatably suspending said cradle when said support descends after squeezing, said cradle being invertible upon said dogging means, and a fluid and spring actuated piston pivotally mounted on said frame member for rotating said cradle and its load in one direction to move it beyond the center of gravity of the loaded cradle to cause complete inversion thereof, said dogging means being operable to separate a mold from the pattern carried by the cradle, and the piston thereafter being operable to rotate the cradle in an opposite direction to move it beyond its re-located center of gravity.

8. The method of forming a mold, which comprises, supporting a pattern from beneath, mounting a flask directly on the upper portion of the pattern, placing sand into the flask and against surfaces of the pattern, jolting the pattern and flask while thus supported, elevating the pattern and flask to squeeze the sand against a platen, immediately thereafter inverting the pattern and flask assembly while maintaining the same in elevated position, lowering the inverted assembly to approximately its original position, and finally leveling the flask and withdrawing the pattern upwardly therefrom.

HARRISON E. FELLOWS.